Feb. 24, 1959 C. P. COLDREN 2,874,430
CLAMP
Filed Oct. 15, 1953

INVENTOR.
CHESTER P. COLDREN
BY
*McDonald & Fragno*
ATTORNEYS

United States Patent Office 2,874,430
Patented Feb. 24, 1959

2,874,430

CLAMP

Chester P. Coldren, Canton, Ohio, assignor to Eaton Manufacturing Company, Cleveland, Ohio, a corporation of Ohio Application October 15, 1953, Serial No. 386,263

9 Claims. (Cl. 24—27)

This invention relates to clamping devices and more particularly to a novel form of clamping device of the self-contracting spring wire type.

Broadly the invention comprehends self-contracting spring wire clamping devices applicable for various uses but especially suitable as a hose clamp or the like and including means for holding the clamp in expanded size ready for use.

Although hose clamps of the self-contracting spring wire type generally disclosed in Patent No. 2,180,271 have been in commercial use for some time, no feasible manner of maintaining the clamps in expanded size or enlarged diameter, that is of a size permitting of the slipping the clamps over the elements to be clamped whereby upon releasing the holding means a clamping operation can be readily effected, has been devised prior to the present invention.

Among the objects of the invention is the provision of a clamp or clamping device of the self-contracting spring wire type, as disclosed in Patent No. 2,180,271, that:

(a) Can be readily and easily placed in open or expanded position ready for assembly use;

(b) Includes means for placing and maintaining the clamping device in open or expanded position permitting of the shipment of devices of this type in quantity to the place of use and whereupon reaching said destination can be immediately and easily applied for their intended use;

(c) Include a pair of axial projecting lugs integral with the device adapted to have locking engagement with one another for securing the device in open or expanded position;

(d) Permits of ease in the application of the device by the use of any leverage member capable of disengaging the lugs whereby the device is free to contract about the element or elements to be clamped;

(e) Permits of the easy removal of the device from its clamping operation through the use of a common pair of pliers whereupon by engaging radially outwardly extended ears of the device the device can be expanded and the lugs engaged for so holding the device as expanded; and (f) Safeguards against danger of the clamping device flying about because of improper gripping with pliers since the device is either expanded or contracted when in surrounding relation to the element or elements requiring clamping.

Other objects and advantages of the invention will appear from the following description taken in connection with the drawings forming a part of the specification, and in which.

Similar reference characters indicate corresponding parts throughout the several views of the drawings.

Figure 1:
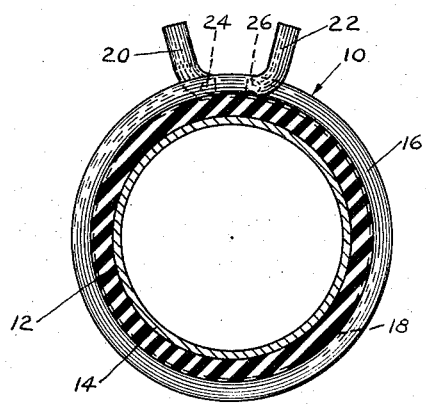
Fig. 1 is an assembly view showing the novel clamp in use and its clamping condition for connecting a hose, or the like, with a substantially rigid tubular member.
Figure 2:
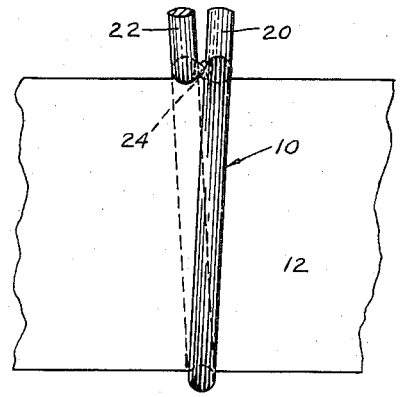
Fig. 2 is a side elevation view of Fig. 1.

The present hose or the like clamping device was devised for the purpose of providing practical means for holding said device in open or expanded position and which means forms an integral part of the device. Furthermore the means which comprises a pair of axially extended lugs is formed on the device in the normal process of manufacture thereof without additional expense. The lugs are in the form of ratchet or one-way clutching teeth and are formed near or adjacent the plier gripping arms or ears of hose clamps of the general type disclosed by Patent No. 2,180,271 wherein the clamp is of loop, generally circular form having portions thereof extending in crossing relation to one another and terminating in radially outwardly extended arms or ears. The lugs or clutch teeth are formed on the inner surfaces of the crossing portions of the device such that upon clamping of the arms and drawing them together the device is brought into enlarged, open or expanded position whereupon the lugs engage each other in clutching fashion to so hold the device in open position. This open position is preferably carried out as a production step at the time of manufacture and prior to the use of the clamping device permitting of the packaging and shipping of such devices to the place of application in a condition ready for use. It is thus conceivable that the clamping devices can then be readily slipped over the elements to be clamped and by simply disengaging the lugs, each clamping device is released permitting of a contractile movement thereof to closed or clamping position. When it is desired to remove the clamping device as so applied the use of a common pair of pliers is sufficient to engage the arms of the device and once again bring the lugs into locking engagement, permitting of ease in slipping the device off the clamped elements.

Referring to the drawing for more specific details of the invention 10 represents generally a novel clamp particularly adaptable as a hose clamp for disposition in surrounding relation to a hose 12 of predetermined diameter and serving the purpose of applying clamping pressure to the hose for securing the same to a rigid tubular member 14 over which the hose extends in telescoping relation.

The clamp 10 is made of spring wire stock and is suitably hardened as to be resilient in character with an inherent spring action rendering the clamp self-contracting for applying a clamping force to hose 12 or to any other member or article to which the clamp is applied.

Figure 3:
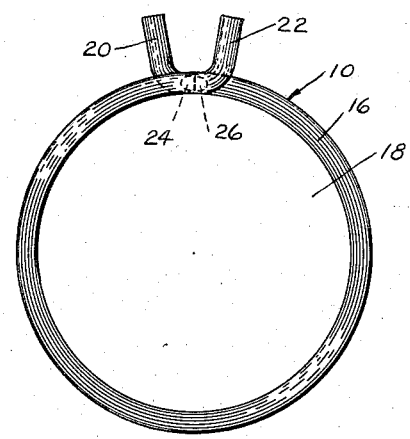
Fig. 3 is an end view of the clamp of Fig. 1 in detached relation, but with the clamp shown in fully expanded secured condition.
Figure 4:
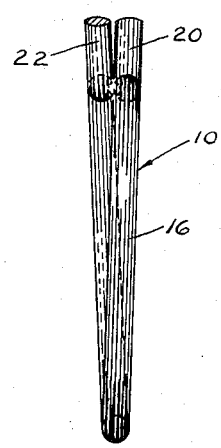
Fig. 4 is a side elevation view of Fig. 3.
Figure 5:
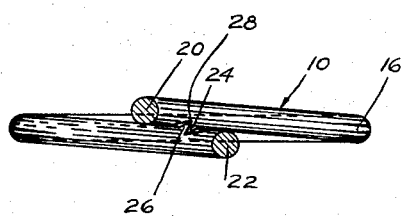
Fig. 5 is a top elevation view of Fig. 3.
Figure 6:
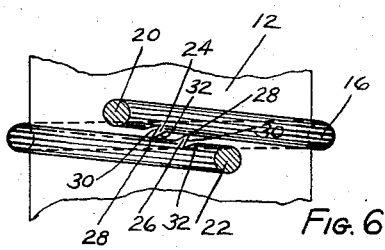
Fig. 6 is a top elevation view of Fig. 1.

Clamp 10 comprises a loop or ring portion 16 defining a clamp opening 18, and a pair of arms or ears 20 and 22 connected with opposite ends of the ring portion 16 and extending generally radially outwardly of the ring portion in substantially opposite directions and in crossing or overlapping relation to each other. The arms 20 and 22 constitute actuating members by which a force can be applied thereto for flexing the clamp to an expanded or open condition, such as disclosed by Fig. 3, and in which condition the clamp and the hose 12, or other member to be engaged thereby, can be brought into assembled relation.

As a means of holding or securing the clamp in expanded or open position, one-way ratchet or clutching lugs 24 and 26 are integrally formed on the surface of the ring portion of the clamp with the respective lugs 24 and 26 near or adjacent the respective arms 20 and 22. The lugs are formed on the inner surfaces of the ring portion of the clamp and are of like configuration, each including a pointed portion 28 and an inward angularly directed surface 30 whereupon as the arms 20 and 22 are brought together the backsides 32 of the lugs slide on and over one another past the pointed portions 28 thereof such that the complementary surfaces 30 of lugs engage one another, with the release of the force upon the arms 20 and 22, effective to hold the clamp in expanded or open condition.

The clamp 10 can be readily or easily released from expanded or open condition merely by inserting a screw driver or other suitable leverage member between the arms 20 and 22 and through a rotation of the leverage member in a counter-clockwise direction pry the lugs apart whereupon the clamp is free to move to closed or contracted condition as shown in Fig. 1.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. A clamp comprising a loop of spring stock wire, the mid-portion of which is in the form of a substantially circular body preformed to a smaller diameter than the work to be clamped, said loop having opposed juxtaposed overlapping end sections and engageable interlocking means integral with said overlapping sections securing the clamp in fully expanded condition of a diameter in excess of the diameter of the work to be clamped and said overlapping end sections being maintained in axially spaced relation along a longitudinal axis of the loop.

2. A clamp according to claim 1 wherein the means include an axial projecting lug on a surface of each of the overlapping sections adapted to be engageable with one another only when the clamp is expanded to a diameter in excess of the diameter of the work to be clamped, one of said lugs having an abutting shoulder portion so disposed on said clamp as to face in the direction of the nearest end section, the other of said lugs having an abutting shoulder portion so disposed as to face in the direction of the end portion remote from said first described lug.

3. A clamp comprising a loop of spring stock wire, the mid-portion of which is in the form of a substantially circular body preformed to a smaller diameter circular body than the object to be clamped, said loop terminating near its opposite end portions in arms extending in overlapping juxtaposed relation to one another and interlocking means, on the surface of the circular body portion of the loop adjacent the arms, engageable to maintain the clamp in open expanded condition and said arms being in axially staggered relationship to each other along a longitudinal axis of the loop when the clamp is in a contracted condition and in said open expanded condition.

4. A clamp according to claim 3 wherein the means includes a pair of axial projecting lugs adapted to have one-way locking engagement with on another, one of said lugs having an abutting shoulder portion so disposed on said clamp as to face in the direction of the nearest end section, the other of said lugs disposed on said clamp so as to face in the direction of the end portion remote from said first described lug.

5. A clamp according to claim 4 wherein the lugs project away from the body of the loop axially toward one another.

6. A clamp according to claim 4 wherein the lugs are provided on axial sides of the juxtaposed overlapping portions of the loop.

7. A clamp comprising a one-piece self-contracting spring wire clamp having a ring portion defining a loop opening and also having arms extending radially outwardly from the ends of said ring portion in crossing relation to each other with the arms being in an axially staggered relation along a longitudinal axis of the loop, said ring portion adjacent the ends thereof having interlocking means formed integrally therewith for use in securing the clamp in an expanded condition of a diameter in excess of the diameter of the object to which the clamp is to be applied and said arms remaining in such axially staggered relation when the clamp is in said expanded condition.

8. A clamp according to claim 7 wherein the means includes one-way locking lugs adapted to be held in engagement by the tension of the clamp when in expanded condition.

9. A clamp comprising a loop of spring stock wire, the mid-portion of which is in the form of a substantially circular body, said loop terminating near its opposite end portions in arms extending in overlapping juxtaposed relation to one another, a pair of lugs, each respectively on said body along the overlapping lengths of said mid-portion adjacent said arms, each of said lugs having circumferentially spaced face portions, the face portions, of the lugs, nearest the arms at the ends of said loop being cooperatively, circumferentially engageable with each other to retain said clamp in expanded position and the face portions, of the lugs, remote from the arms at the ends of said loop being engageably, circumferentially, relatively movable whereby said lugs may be engaged by movement of said arms toward each other and said clamp may be held in expanded position by said lugs.

References Cited in the file of this patent

UNITED STATES PATENTS

| | | |
|---|---|---|
| 973,532 | McLaughlin | Oct. 25, 1910 |
| 2,006,358 | Kurkjian | July 2, 1935 |
| 2,180,271 | Arras | Nov. 14, 1939 |
| 2,472,172 | Ovens et al. | June 7, 1949 |
| 2,629,908 | Keck | Mar. 3, 1953 |

FOREIGN PATENTS

| | | |
|---|---|---|
| 461,048 | Great Britain | Feb. 9, 1937 |